(12) United States Patent
McGary et al.

(10) Patent No.: US 8,700,024 B2
(45) Date of Patent: Apr. 15, 2014

(54) SYSTEM AND METHOD FOR ENHANCED DIRECTORY ASSISTANCE INCLUDING COMMERCIAL FEATURES

(75) Inventors: Faith McGary, Bethlehem, PA (US); Michael Bates, Worthington, OH (US); Alan Sunners, Coopersburg, PA (US)

(73) Assignee: Grape Technology Group, Inc., Bethlehem, PA (US)

( * ) Notice: Subject to any disclaimer, the term of this patent is extended or adjusted under 35 U.S.C. 154(b) by 1021 days.

(21) Appl. No.: 12/070,725

(22) Filed: Feb. 20, 2008

(65) Prior Publication Data

US 2008/0215442 A1   Sep. 4, 2008

Related U.S. Application Data

(60) Provisional application No. 60/902,382, filed on Feb. 20, 2007, provisional application No. 60/904,318, filed on Mar. 1, 2007, provisional application No. 60/958,108, filed on Jul. 2, 2007, provisional application No. 61/066,174, filed on Feb. 15, 2008.

(51) Int. Cl.

| H04M 11/00 | (2006.01) |
|---|---|
| G06Q 20/00 | (2012.01) |
| H04W 4/20 | (2009.01) |
| H04L 12/58 | (2006.01) |
| H04M 15/00 | (2006.01) |
| H04W 4/24 | (2009.01) |

(52) U.S. Cl.
CPC ............... *H04W 4/206* (2013.01); *H04W 4/24* (2013.01); *H04L 12/5855* (2013.01); *H04M 15/00* (2013.01)
USPC ........................ 455/422.1; 455/406; 705/64

(58) Field of Classification Search
CPC .. H04W 12/08; H04M 15/00; H04M 15/8038
USPC ................ 455/456.3, 414.2, 422.1, 406–411; 705/64
See application file for complete search history.

(56) References Cited

U.S. PATENT DOCUMENTS

| 6,711,474 | B1 * | 3/2004 | Treyz et al. ........................ 701/1 |
|---|---|---|---|
| 7,098,869 | B2 * | 8/2006 | Vaitekunas et al. ............ 345/2.1 |
| 7,103,368 | B2 * | 9/2006 | Teshima ..................... 455/456.3 |
| 7,263,378 | B2 * | 8/2007 | Inselberg ....................... 455/517 |
| 7,577,244 | B2 * | 8/2009 | Taschereau .............. 379/218.01 |
| 7,637,810 | B2 * | 12/2009 | Amaitis et al. .................. 463/25 |
| 7,702,318 | B2 * | 4/2010 | Ramer et al. ............... 455/414.2 |
| 7,751,804 | B2 * | 7/2010 | Steelberg et al. .......... 455/414.2 |
| 2002/0035619 | A1 * | 3/2002 | Dougherty et al. ........... 709/219 |
| 2007/0203836 | A1 * | 8/2007 | Dodin ............................. 705/44 |

* cited by examiner

*Primary Examiner* — Nizar Sivji
(74) *Attorney, Agent, or Firm* — Sofer & Haroun, LLP

(57) ABSTRACT

A method for enhanced commercial activities to a mobile device user includes providing a user with an application for use on a mobile wireless device and receiving an incoming communication from the wireless device via the application at an enhanced services platform of a directory assistance center. Stored account information, associated with the user is retrieved and a coded information is received from the wireless device, where the coded information is generated by the application based on input uploaded onto the wireless device by the user obtained from any one of the group selected from a product advertisement, a product price tag and digital image of a product. The coded information is parsed at the enhanced services platform, options are retrieved related to a product corresponding to the coded information and the user is provided with options relating to the product.

8 Claims, 10 Drawing Sheets

```
ACCOUNT PROFILE 209

HOME ADDRESS            —   XXXXXXXX
BILLING INFORMATION     —   XXXXXXXX

PERSONAL SIZES          —   XXXXXXXX
PERSONAL AD PREFERENCES —   XXXXXXXX

STORED PERSONAL DATA    —   XXXXXXXX
ATTACHED CONTACT LISTS  —   XXXXXXXX

EVENT PASSES            —   XXXXXXXX

OTHER STORED DATA       —   XXXXXXXX
                            XXXXXXXX
```

FIG. 6

SYSTEM AND METHOD FOR ENHANCED DIRECTORY ASSISTANCE INCLUDING COMMERCIAL FEATURES

RELATED APPLICATION

This application claims priority to U.S. Provisional applications: 60/902,382 filed on Feb. 20, 2007, 60/904,318 filed on Mar. 1, 2007, 60/958,108 filed on Jul. 2, 2007 and U.S. provisional patent application Ser. No. 61/066,174 filed on Feb. 15, 2008, the entirety of which are incorporated herein by reference.

FIELD OF THE INVENTION

This invention relates to the field of directory assistance. More particularly, the present invention is in the field of commercial transactions supported through directory assistance.

BACKGROUND

In the area of commercial sales and advertising many retail sales enterprises dedicate significant resources towards advertising in order to attract new and retain existing customers. Such advertising relies on the consumers remembering the advertising and then purchasing the products at a later time, either in brick and mortar stores or on-line.

Other commercial enterprises that are staged in large venues such as trade shows, concerts, even typical mall experiences require the customers to travel through various areas of the venue, view advertising and make purchases. However, such commercial experiences may be overwhelming for many consumers, making it difficult to navigate all of the desired locations/events. Additionally, from the commercial enterprise's standpoint, it is difficult to track the various consumers' activities and purchases, thus failing to realize valuable commercial advertising information.

Additionally, in the area of mobile devices, such as mobile phones, PDAs, e-mail devices, web enabled devices, etc. . . . , mobile connectivity and hand held processing power is ever increasing.

OBJECT AND SUMMARY

The present invention looks to overcome the drawbacks associated with the prior art by providing an improved mobile device with wireless connectivity that both enhances various commercial interactions for the user, while simultaneously providing improved tracking information to the commercial enterprises for later use in advertising and auditing of promotional activities.

The present invention provides a mobile device that is used as a hand held commercial device for use in enabling commercial transactions, commercial event information/access; as well as product/event information services to the user.

To this end, the present invention is directed to a method that provides enhanced commercial activities to a mobile device user including providing a user with an application for use on a mobile wireless device and receiving an incoming communication from the wireless device via the application at an enhanced services platform of a directory assistance center. Stored account information associated with the user is retrieved and coded information is received from the wireless device. The coded information is generated by the application based on input uploaded onto the wireless device by the user obtained from any one of the following; a product advertisement, a product price tag and digital image of a product. The coded information is parsed at the enhanced services platform, options are retrieved related to a product corresponding to the coded information and the user is provided with options relating to the product.

BRIEF DESCRIPTION OF THE DRAWINGS

The present invention can be best understood through the following description and accompanying drawings, wherein:

FIG. 6 is an account table for a user of a widget in accordance with one embodiment of the present invention;

DETAILED DESCRIPTION

Figure 1:
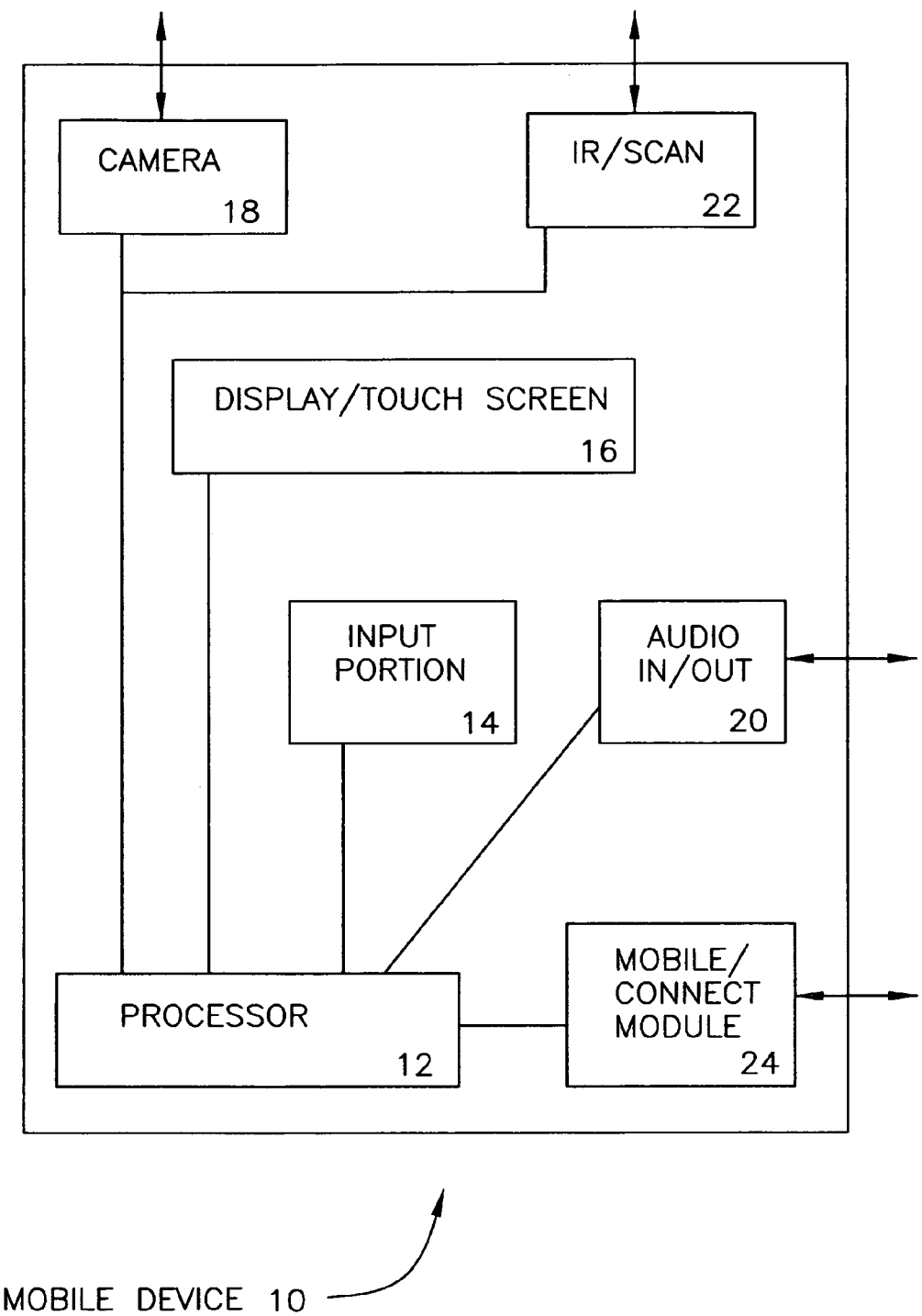
FIG. 1 illustrates a wireless device, in accordance with one embodiment of the present invention.

In one embodiment of the present invention, as illustrated in FIG. 1, a mobile device 10 is utilized to employ a directory assistance enabled commercial support widget. Mobile device 10 preferably maintains a processor 12, an input portion 14, a display/input touch screen 16, a image input camera 18, an audio input output module 20 an infra-red scanner input device 22 and a mobile connectivity element 24.

Processor 12 of mobile device 10 is configured to run all of the necessary software executable files and manage all of the hardware devices necessary for supporting the features of the invention as discussed in more detail below. Input portion 14 may be one or more input means, such as keys for inputting data or commands into device 10. Display touch screen 16 may be a typical LCD display screen or alternatively, may be a touch screen 16 so that it doubles as both the primary display interface as well as the input interface for the user.

In one embodiment of the present invention, camera 18 is a typical digital camera device for capturing and inputting images into device 10. Audio input output module 20 includes typical microphone, speaker and amplifier components necessary for both two way communications through mobile device 10 as well as for inputting voice activation commands to the device. Such arrangements allow for enhanced audio/visual output as well as facilitating hands free operation. Device 10 may also optionally maintain an infra-red scanner, such as a barcode scanner so that device 10 is able to scan and read various stored coded data (ie. barcodes or encrypted data) as will be described in more detail below.

Device 10 also maintains a wireless connectivity module 24 coupled to processor 12 for managing all wireless input and output to and from device 10. For example, it is contemplated that wireless module 24 is a primary wireless connectivity element that supports cellular, Wi-Fi/Wi-Max, Bluetooth, or other such communication pathways. Furthermore, wireless module 24 may further support RFID (Radio Frequency Identification) transmitter/receiver functionality so that mobile device 10 may communicate locally with other RFID enabled devices, including other mobile devices.

The salient features of the present invention described below are supported by wireless connectivity element 24. It is understood as new and improved wireless protocols are developed that wireless connectivity element 24 can support such formats and provide the necessary connectivity and bandwidth to support such features.

It is understood that the above described list of elements for mobile device 10 is considered exemplary and is not intended to limit the scope of the present invention.

Figure 2A:
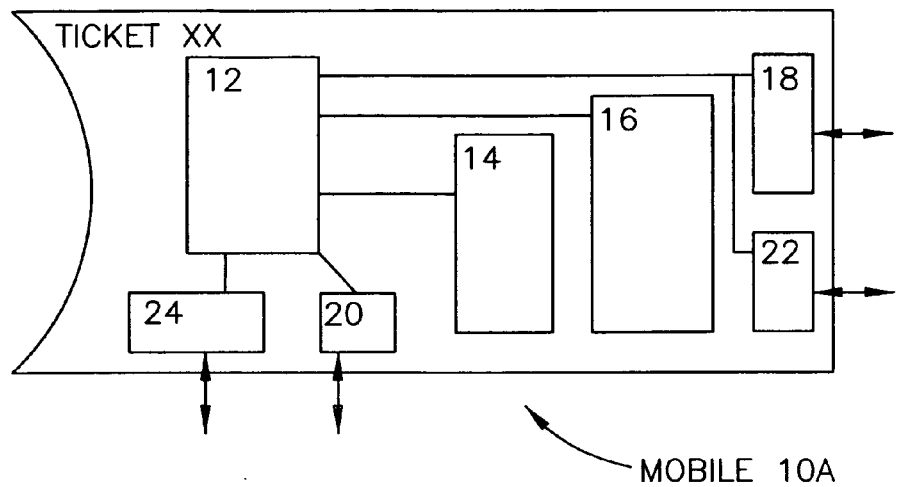
FIG. 2A illustrates a wireless device, in accordance with another embodiment of the present invention.

In one embodiment of the present invention, the physical form of device 10 may be a basic form such as a mobile phone, mobile personal device or other such hand held device. In another arrangement, as illustrated in FIG. 2A, device 10 may be made in the form of an event ticket 10A.

In such an arrangement, mobile enabled event ticket 10A has all of the same features as mobile device 10 as outlined above. However, the physical representation, including the outer shell of the device and corresponding skin/imagery on display screen 16 create a simulacrum of an event ticket, such as a concert ticket.

Figure 2B:
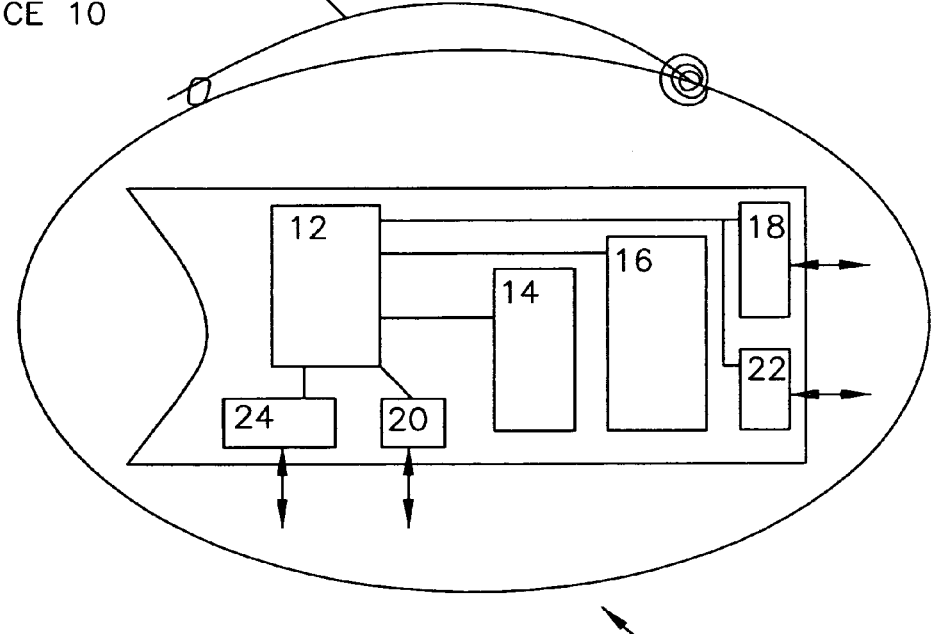
FIG. 2B illustrates a wireless device, in accordance with another embodiment of the present invention.

In another embodiment of the present invention, FIG. 2B illustrates another version where device 10 is implemented as a wearable, or fashion accessory 10B. Again, as with event ticket device 10, fashion accessory wearable device 10B has all of the same features as mobile device 10 as outlined above. However, the physical representation, including the outer shell of the device and corresponding skin/imagery on display screen 16 create a simulacrum of a wearable item including, but not limited to a brooch, hat, article of clothing, name tag, arm band/watch, etc.

The above descriptions of devices 10, 10A and 10B are intended only as examples of possible devices 10. Any similar wireless enabled devices 10 that employ similar components to similar ends are within the contemplation of the present invention. Furthermore, device 10 may be an item directly owned by the user, or alternatively, device 10 may be owned by a commercial enterprise and lent to the user(s) for certain functions as described in more detail below.

In one embodiment of the present invention, a commercial application widget 100 is implemented on and through device 10. As described in detail below, widget 100 is an executable program, linked with an enhanced services platform at a directory assistance center, allowing the user of mobile device 10 to engage in numerous enhanced commercial activities including event access, event product information retrieval, and product purchase.

In one arrangement, widget 100 is an executable software program run by processor 12 of wireless device 10. In this configuration, widget 100 may be obtained at any time with initial download and updated though wireless connectivity element 24. Alternatively, widget 100 may be a hardware implemented program that is embedded within processor 12 from purchase whereby device 10 is intended for implementation solely in conjunction with the enhanced features of the present invention. Additionally, it is envisioned that widget 100 may be implemented as a combination of such designs.

In one arrangement of the present invention widget 100 is a client-side application, configured to execute outside of the typical web-browser interface and to initiate connection directly with a directory assistance center as described in more detail below with respect to FIG. 4.

Figure 3A:
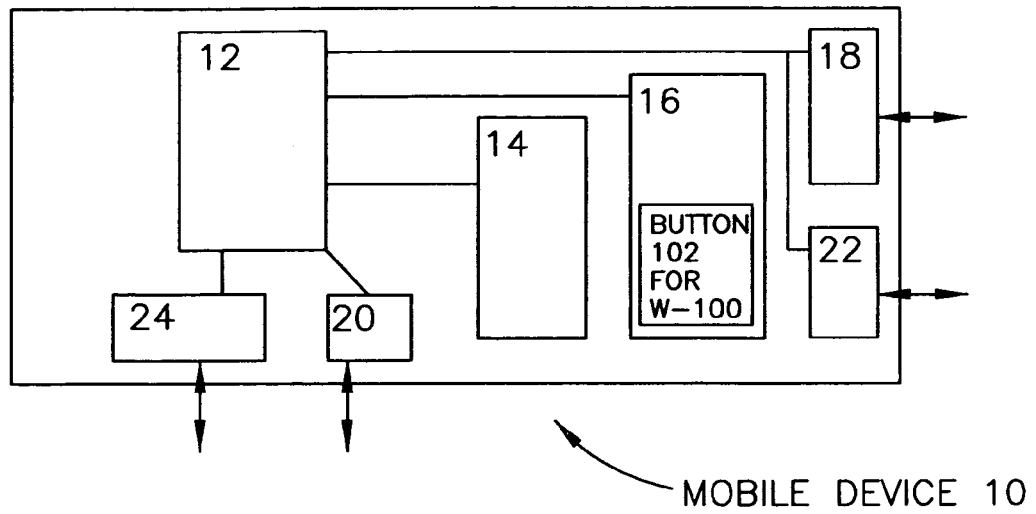
FIG. 3A illustrates an activation button for the device of FIG. 1, in accordance with one embodiment of the present invention.

In one arrangement, as illustrated in FIG. 3A, the activation of widget 100 on device 10 is implanted via quick activation button 102 or "hot button." Button 102 is used to open widget 100, initiate connection to the enhanced services platform of the directory assistance center and to prompt the user in some visual or audio manner for input or action.

Figure 3B:
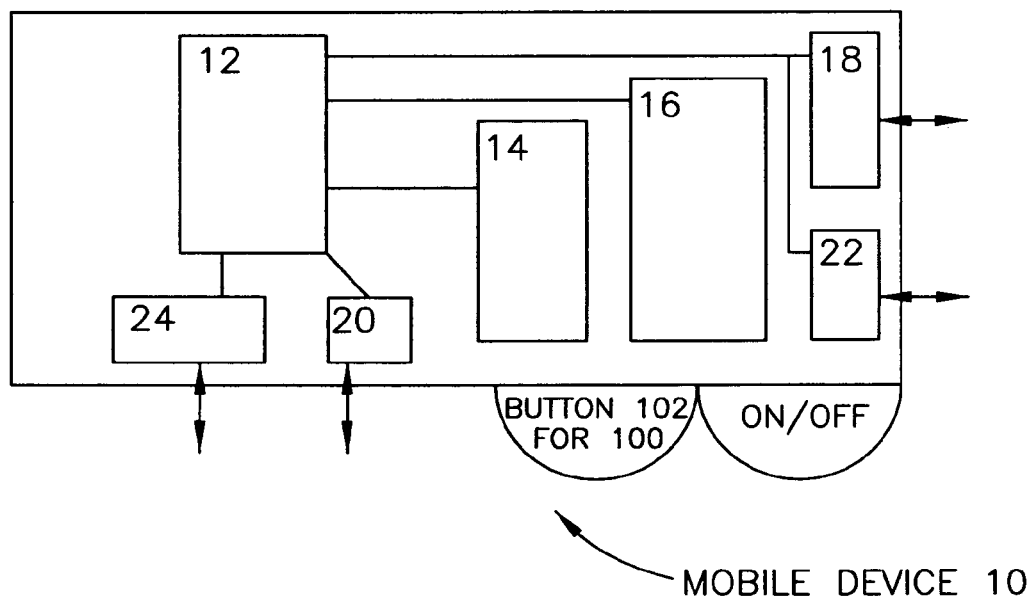
FIG. 3B illustrates an activation button for the device of FIG. 1, in accordance with another embodiment of the present invention.

As shown in FIG. 3A, button 102 is in the form of a physical button that is located on device 10, such as near the power button. Alternatively, as shown in FIG. 3B, button 102 may be implemented as a soft button through display/touch screen 16, appearing as an icon that is readily accessible and identifiable to the user for activating widget 100. In either arrangement, button 102 may be statically set for the sole function of implementing widget 100 or, alternatively, may be a dynamically set button which is set by the user based on their preference.

In the event that device 10 is implemented as an event ticket device 10A or wearable device 10B as shown in FIGS. 2A and 2B, it is contemplated that button 102 may be incorporated into the overall aesthetic design.

Figure 4:
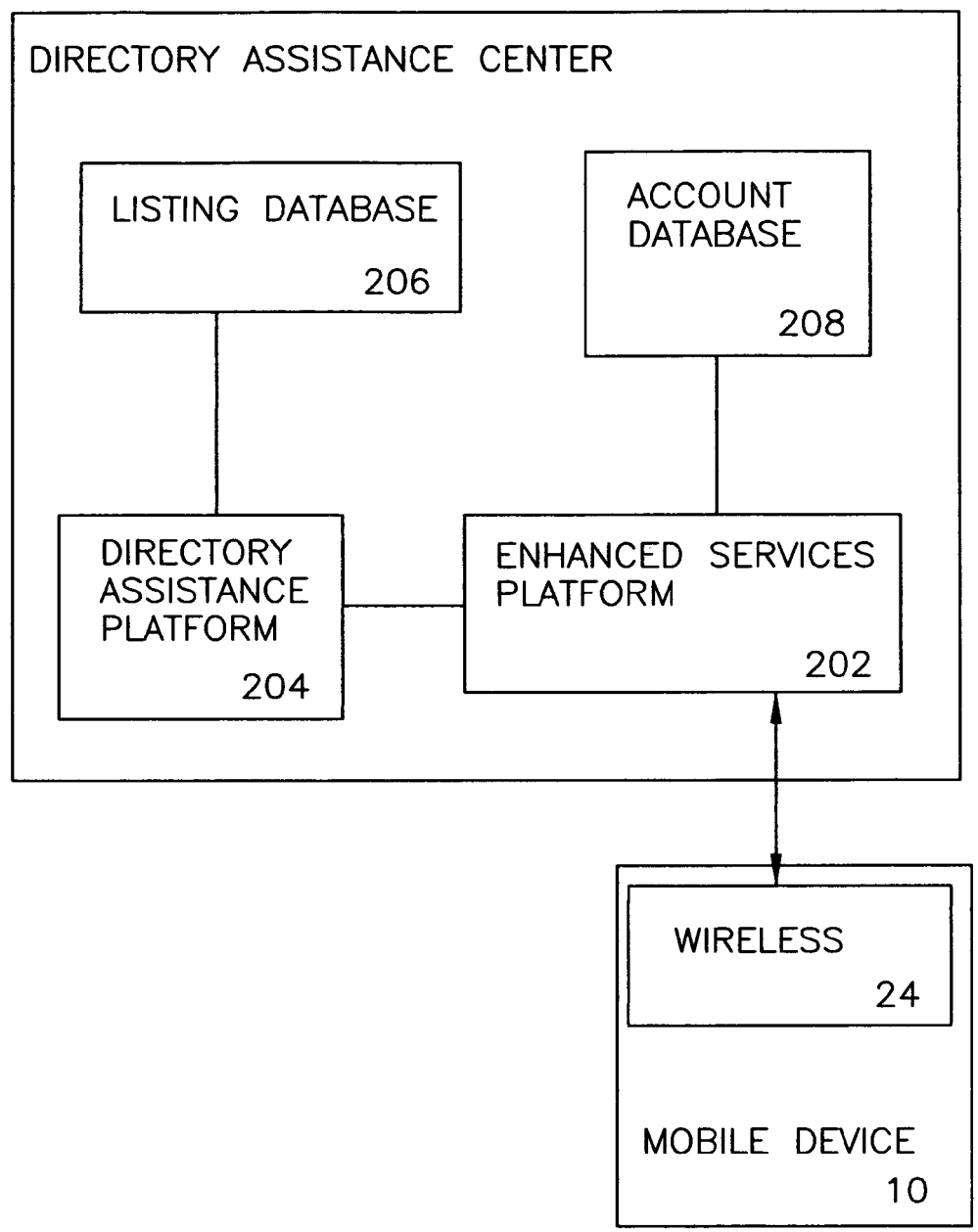
FIG. 4 illustrates a widget in the wireless device of FIG. 1 in contact with a directory assistance center, in accordance with one embodiment of the present invention.

In one embodiment of the present invention, as illustrated in FIG. 4, activation of widget 100 causes device 10 to connect to an enhanced services platform 202 of a directory assistance center 200. Directory assistance center 200 may be a typical directory assistance center having directory assistance platform 204 for providing responses to directory queries, for example from callers for contact information. Such a directory assistance platform 204 is typically connected to one or more listing databases 206 and is capable of receiving any form of incoming request communication including voice or electronic (SMS, IM, e-mail etc. . . . ), retrieving desired contact information and responding to the requester in kind and in their desired format.

In one arrangement of the present invention, directory assistance center 200 maintains an enhanced services platform 202 for implementing various advanced commercial activities for users of the present invention. Enhanced services platform 202 is preferably coupled to a user account database 208 that is used to store user account information as discussed in more detail below.

It is understood that the components of directory assistance center 200 are exemplary and in no way intended to limit the scope of the present invention. It is understood that directory assistance center 200 may in fact be implemented as a distributed network and furthermore, that certain elements may be added or removed and alternatively may be supported by other external third parties as desired.

Figure 5:
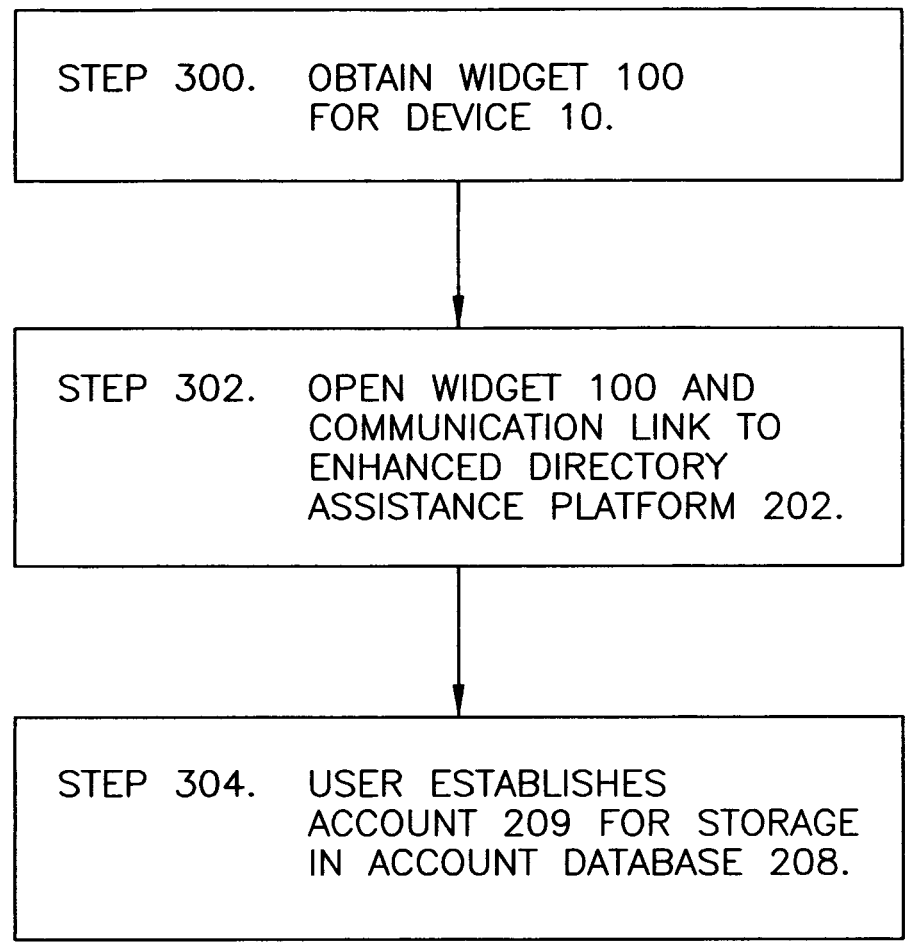
FIG. 5 is a flow chart showing an account set-up process for a widget, in accordance with one embodiment of the present invention.

In one embodiment of the present invention as illustrated in flowchart FIG. 5 a user or commercial establishment obtains widget 100 for device 10, open widget 100 thereby connecting to enhanced services platform 202 opens an account.

In the first step 300, a user or commercial establishment obtains widget 100 for operation on their device 10. For example, in a typical arrangement, a user, through their carrier or directly from directory assistance center 200 may request and download widget 100 to their processor 12 through wireless contact module 24. In another arrangement, device 10 may be obtained initially with widget 100 already loaded. In yet another arrangement, a commercial establishment may obtain a number of devices 10, each having widget 100, for distribution to one or more customers or event attendees. It is understood that widget 100 may be obtained in any number of additional manners.

In step 302, user opens widget 100, possibly by using activation button 102 or by opening a wireless connection with enhanced services platform 202. If the user has previously operated widget 100 then they may skip to the various uses of widget 100 as explained in more detail below. However, assuming the user is new, enhanced services platform 202 initiates a new user sequence to obtain information to populate an account profile 209 for storage in account database 208.

At step 304, the user interacts with either a live operator or an automated platform (via text, web, e-mail WAP, etc. . . . ) in order to enter account information into profile 209. It is contemplated that widget 100 may be available to the user on a use-by-use basis or on a monthly fee basis. Information necessary for billing and billing management may be stored in account profile 209.

As illustrated in FIG. 6, the personal account information that may be stored, including but not limited to, home address (for billing/product delivery), billing arrangement, payment options (for billing/product purchase/event access), personal sizes (for clothing orders), personal preferences (for receiving advertisements or coupons), stored data (including stored pictures, and music downloads), personal contact lists (business and personal contacts), special event passes (and associated access codes) and any number of other information that may be necessary or advantageous for supporting a personalized commercial assistance service through widget 100.

It is understood that the above list of account profile 209 is intended as an exemplary list of possible information stored within profile database 208 for facilitating the various transactions as outlined below. Any additional information items or other related supporting information is within the contemplation of the present invention.

Figure 7:
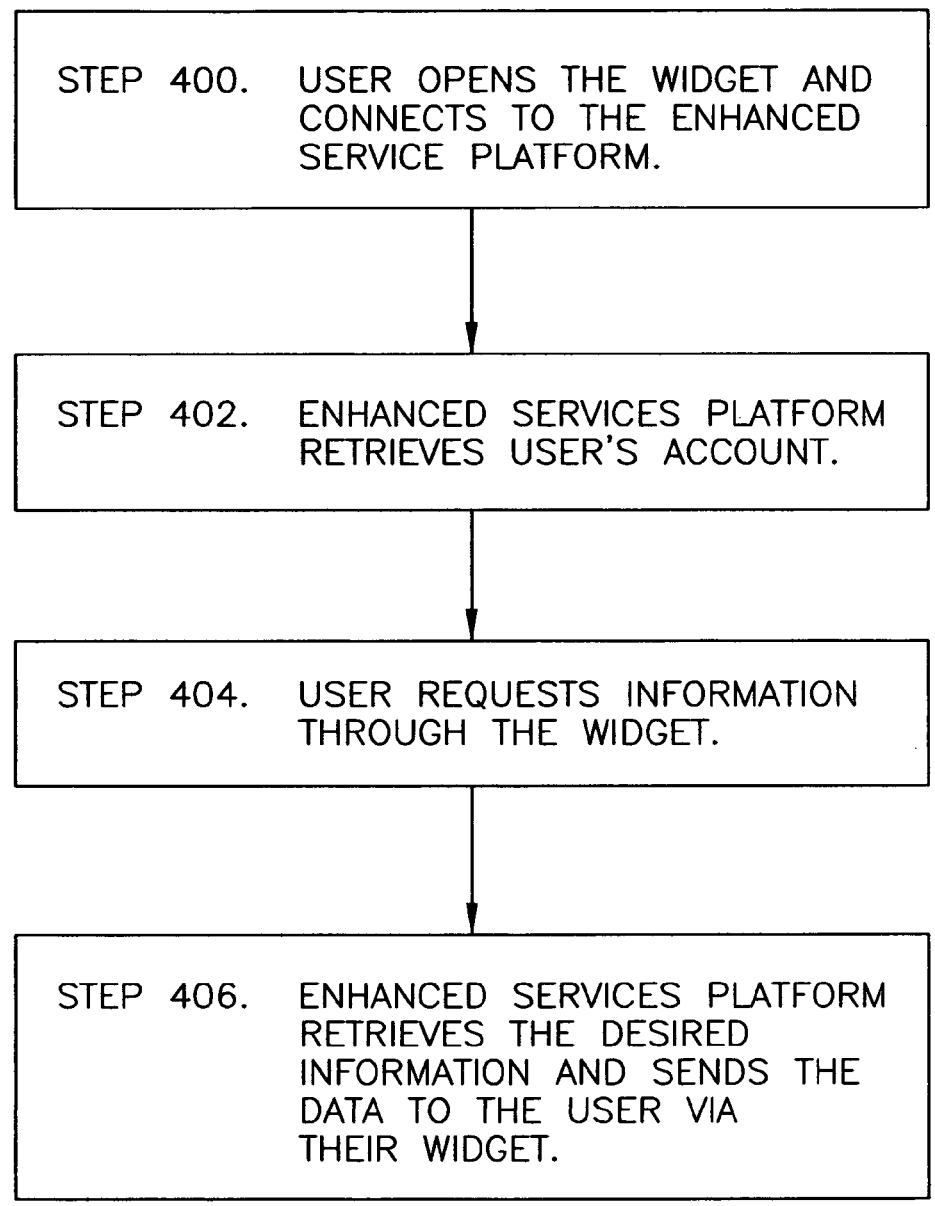
FIG. 7 is a flowchart of the operation of a widget on a device from FIG. 1, in accordance with one embodiment of the present invention.

Turning now to the exemplary use of widget 100, in a first example outlined in flowchart FIG. 7, widget 100 is simply implemented as an enhanced directory assistance system with improved connectivity and support via widget 100.

In step 400, the user activates widget 100 and opens a connection to enhanced services platform 202. At step 402, widget immediately sends the necessary contact information via wireless connectivity module 24, including an identifier or code that allows enhanced services platform 202 to immediately retrieve the corresponding user account 209 from account database 208.

Next, at step 404, the user enters a request for a service, such as a directory assistance request that may be handled by directory assistance platform 204. At step 406, enhanced directory assistance platform 202 retrieves the requested information and delivers it to widget 100 for display to the user.

The above outlined steps are illustrative of the basic operation of widget 100. Additional functions that may be carried out in a similar manner may include, but are not limited to; updating account 209 information, directions requests, map requests, traffic requests, restaurant reviews/reservation, download or stream video or audio files, uploading/downloading pictures to account 209 and changing the widget skin etc. . . . .

In this arrangement, widget 100, allows for faster and direct wireless connection to enhanced directory assistance activities. Furthermore, it is contemplated that the skin may include or be entirely advertising space that may be targeted to the user based on the profile 209 information. Acceptance of such advertising may lower or remove the cost to the user for widget 100 and accessing directory assistance features, and is also desirable for the advertiser as better demographic and usage tracking may be made available through cookies and usage tracking software embedded in widget 100. In fact advertising through the skin of widget 100 may be modified, at each action by the user accordingly, such as automation pulse skin changes in sync with requests, such as advertisements for music during a music download request.

In an alternative arrangement for steps 400 through 404, button 102 may be configured, once activated, to cause the wireless device to transmit a pre-fabricated request from device 10 to enhanced services platform 202. For example, pressing button 102 on device 10 may, rather than simply opening widget 100, may take a directory assistance request already typed out by the user in SMS format, and send it through widget 100 all in one step for an even more efficient and less time consuming return result.

Figure 8:
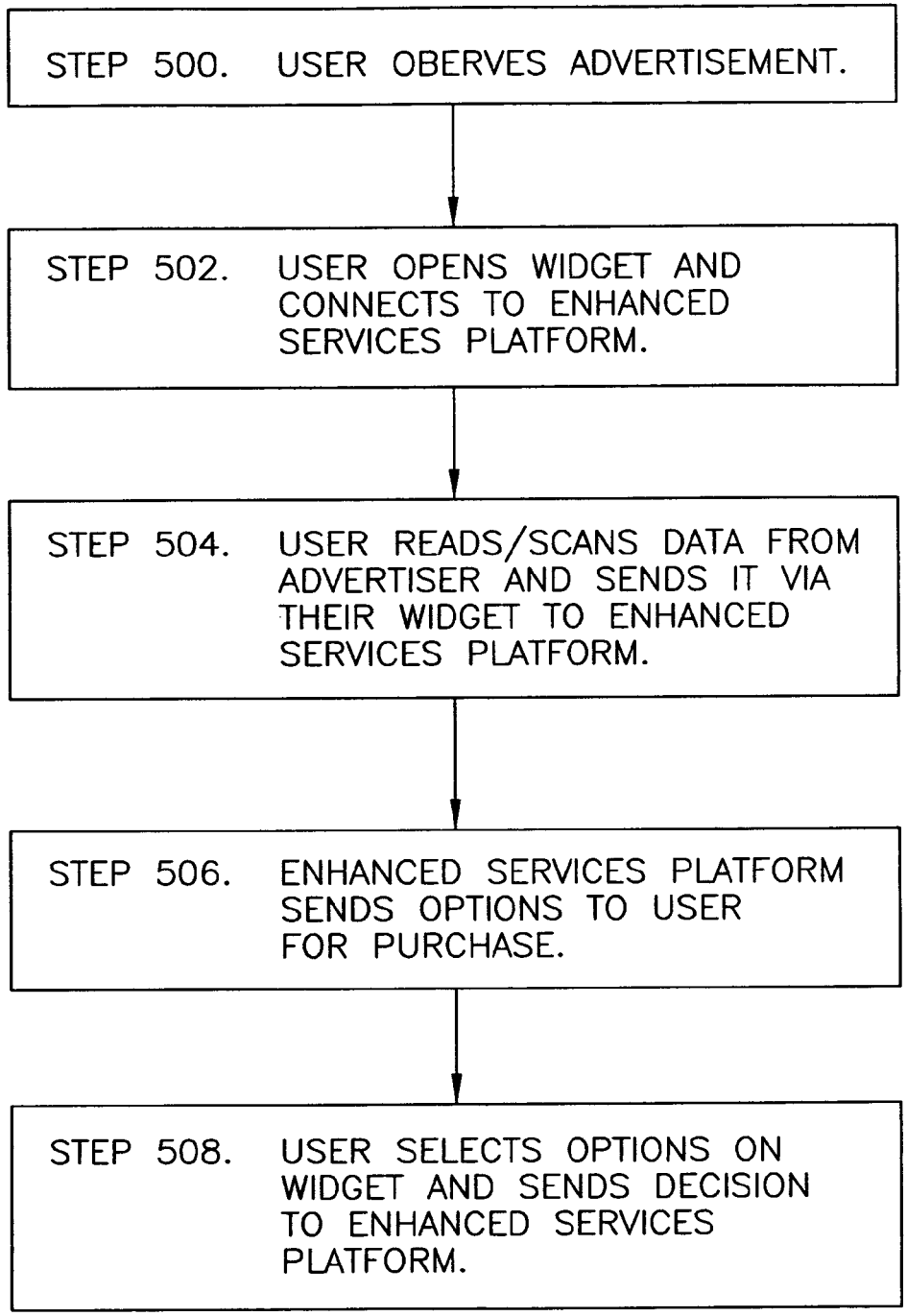
FIG. 8 is a flowchart of the operation of a widget on a device from FIG. 1, in accordance with another embodiment of the present invention.

In another embodiment of the present invention, as illustrated in flowchart FIG. 8, widget 100 may allow a user to conduct a commercial transaction using information contained in their account 209.

For example, in a first step 500, a user may see an advertisement for a desired item, such as an article of clothing. At step 502, the user opens widget 100, possibly using button 102. Next at step 504, the user enters the product information into their mobile device for incorporation by widget 100 for delivery to enhanced services platform 202.

At step 506, the user is prompted with several options, including, but not limited to obtaining more information about the product, purchasing the product, adding it to a future buying list, etc. . . . . Next, at step 508 the user indicates to enhanced directory assistance platform 202 which option to perform.

It is contemplated that one advantage of using widget 100 on device 10 during step 504 is that camera 18, infra-red device 20 or wireless module 24 (such as wireless RFID) may be used to upload specific information to device 10 for use by widget 100 to send to enhanced services platform 202.

For example, participating commercial enterprises may employ RFID enabled advertisements that include an embedded product chip within the advertisement. In such an instance, a user nearby may simply detect and download the RFID information at step 504 which would then provide enhanced services platform 202 with information on which commercial item is desired by the user. In fact, using the stored information in account 209, the user may be allowed to not only upload the information from the RFID in the advertisement, but to conduct the entire purchase through their widget 100 if desired as outline in steps 506 and 508.

In another example, a user in a store may employ infra-red device 100 to scan either coupons on product barcodes for sending through widget 100 to enhanced services platform 202 for additional information and/or express purchasing.

In yet another example, a user may photograph an item using camera 18. The image may be sent by widget 100 to enhanced services platform 202 where an operator may, using the internet, optical recognition software and other tools, identify the item and provide additional information to the user.

In each instance, utilizing widget 100 allows for direct high speed connection, possibly advertiser supported, to enhanced services platform 202 for faster access and responses to the desired data and actions. Furthermore, widget 100 facilitates the easy transition of uploading information and transmission of this data to the directory assistance center 200 for conducting the desired commercial activity.

Yet another advantage of the present invention is that advertisers, such as advertisers who use the above identified RFID or other "electronically enabled" advertisements, may be provided with extremely detailed information of exactly which advertisements are being seen and are effective (using embedded RFID information sent by inquiring/purchasing user devices 10), detailed demographic data from account 209 of who is looking/buying from the advertisements, and the ability to direct specific advertisements to these interested users, such as for new product lines, directly through widget 100. It is further contemplated that if device 10 is GPS or otherwise location enabled, the geographic location of the user during the information request/purchase may be passed along to the commercial enterprise or advertiser.

Although the above descriptions have the user using their own device 10, it is also within the contemplation of the present invention that a commercial entity may sell or give away enabled mobile devices 10, pre-installed with widget 100, possibly in the form of wearable devices 10B, in promotional events or other such activities.

Figure 9:
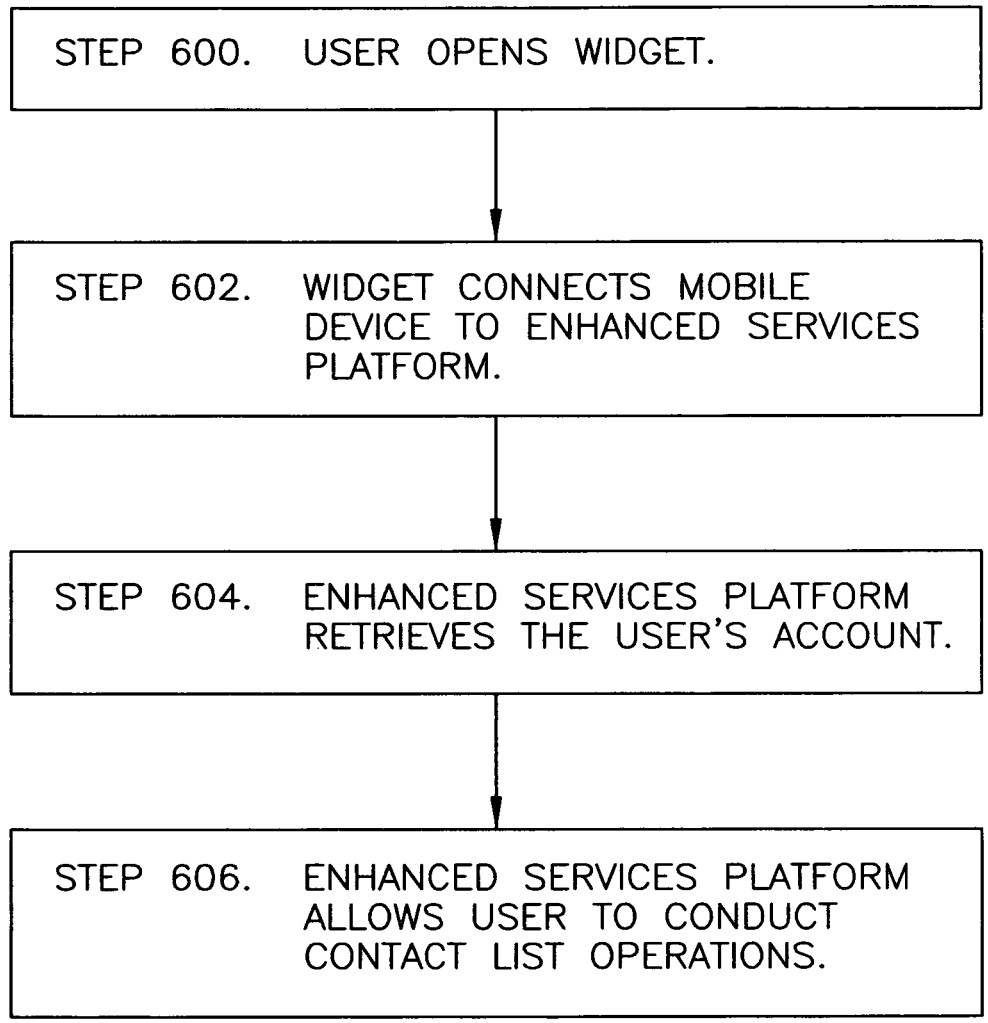
FIG. 9 is a flowchart of the operation of a widget on a device from FIG. 1, in accordance with another embodiment of the present invention.

In another embodiment of the present invention, as illustrated in flowchart FIG. 9, widget 100 may allow a user to create, manage and update an enhanced business or personal contact list At a first step 600, the user opens widget 100, and at step 602, widget 100 connects device 10 to enhanced services platform 202.

Next, at step 604, enhanced services platform 202 retrieves the associated account information 209 from account database 202. At step 606, using widget 100 the user is allowed to perform any number of contact list operations, including, but not limited to, generating a list, updating a list, coupling an existing list, viewing the locations of other members on the list etc. . . . . .

In a first example, using the above described system and method, a business user may use a contact list stored in account information 209 for sales or other business contacts. Initially, this list may be imported from the traditional mobile device contact list using widget 100 or it may be entered manually as each new entry becomes known. However, such business contacts typically may become stale quickly, particularly when managing large sales contact lists. Thus, according to the present invention, while widget 100 is connected to enhanced services platform 202, the user may request a full update, whereby enhanced services platform 202 forwards each contact from a stored contact list in database 208 to the traditional directory assistance platform 204 for lookup against listing database 206. Any inconsistencies or stale numbers may be updated nearly instantly. Updates may be alerted to the user's device using SMS, e-mail or other means.

Also, in addition to updating contact information, enhanced services platform 202 may be set up to run periodic news searches against business contacts for news alerts, stock quotes or other such data that may be relevant to that contact. For example, if a customer's business undergoes a new successful enterprise that is reported in the news, the user of device 10 may receive an alert via widget 100 that alerts them to the news.

In another example of use of the contact list management through widget 100, a personal user may import contact list information from their device 10 or from an on-line source, such as one of the common personal information websites on the internet. By linking these accounts to the user's stored account 209, the user may set preferences such that enhanced services platform 202 is allowed to synchronize all lists, when any one of the lists is updated (on some periodic basis).

In yet another example, a user may set their preferences in their account 209 such that when online through widget 100, they may utilize a group connect feature with one or more of their friends that also employ widget 100. In such an instance, widget 100 may support enhanced connectivity of audio and visual, as well as geographic location information through enhanced directory platform 202 to facilitate live streaming audio/video/text between members of a group.

Figure 10:
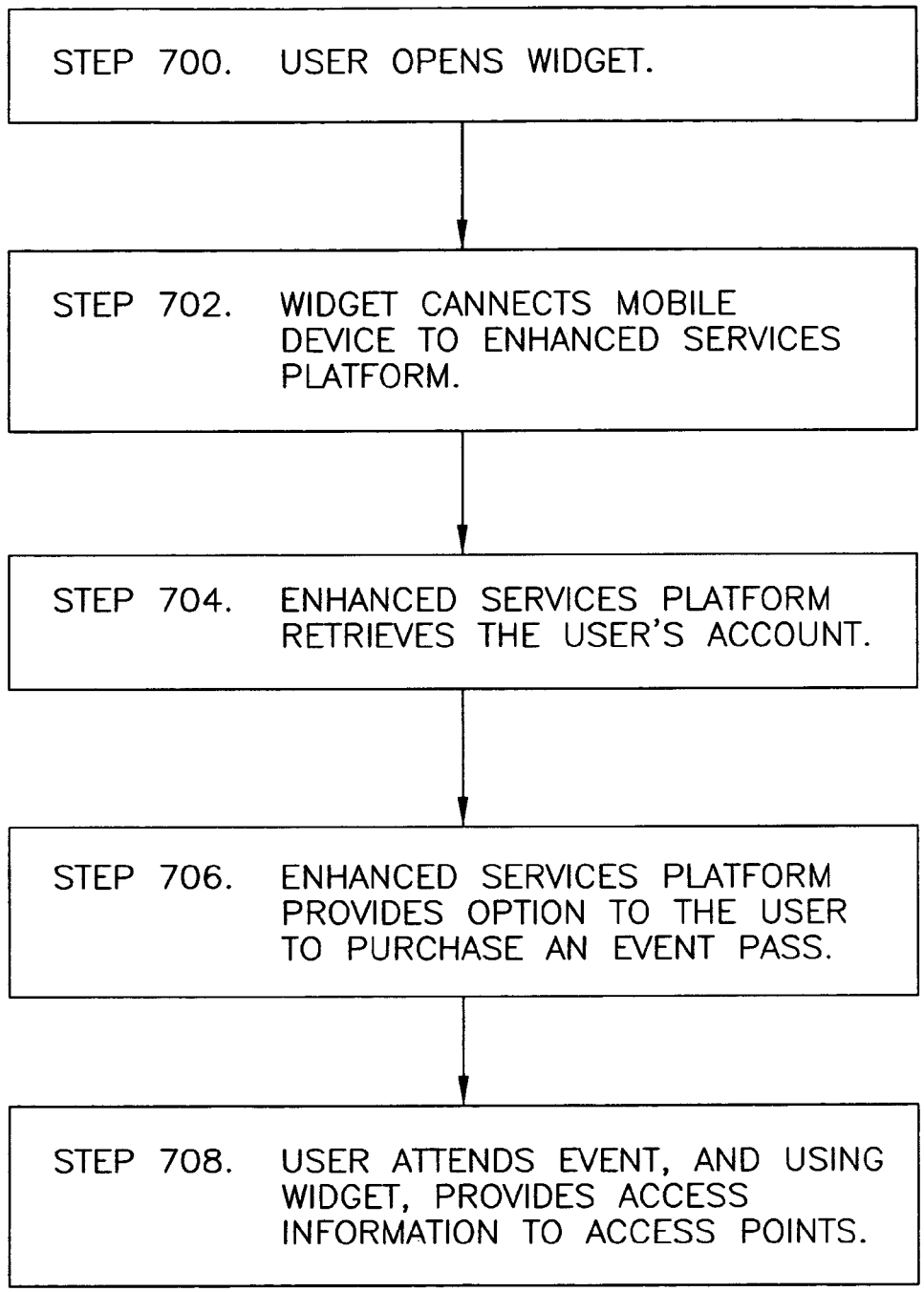
FIG. 10 is a flowchart of the operation of a widget on a device from FIG. 1, in accordance with another embodiment of the present invention.

In another embodiment of the present invention, as illustrated in flowchart FIG. 10, widget 100 of device 10 may be used as an event pass/information device.

At a first step 700, the user opens widget 100, and at step 702, widget 100 connects device 10 to enhanced services platform 202.

Next, at step 704, enhanced services platform 202 retrieves the associated account information 209 from account database 202. At step 706, using widget 100 the user enters the appropriate information or purchases access to a particular event. In doing so, account 209 is populated with the necessary access codes and other accompanying data for an event.

At step 708, the user brings device 10 to the desired event. At one or more access points within the event, device 10 interacts with an electronic checkpoint, using for example RFID or some other wireless interaction. At step 710, at each interaction point, widget 100 enters two-way communication with enhanced services platform 202 and obtains the necessary access code for proceeding. Additionally, any corresponding data may be forwarded to widget 100 for retrieval by the user.

For example, in one arrangement, such an system and method may be employed to access a concert. Here a user may purchase their ticket through enhanced services platform 202 using widget 100. The necessary information and confirmation codes may then turn their device 10 into a function ticket for the event. One advantage to the user is that the same ticket may be used for accessing additional points within the venue, such as VIP areas or other such zones. Also, bonus information, or downloads may be provided to the user via widget 100 at each access point.

In such an arrangement, to permit smooth handoff between the different access points, wireless/RFID enabled access points may have overlapping coverage with each other so that devices 10 that move between coverage areas are not dropped.

From the event organizer/merchant perspective, widget 100 may be populated with any number of ancillary advertising information that is forwarded to device 10. Also, demographic data from account 209 may be supplied to the event sponsor as well as other location and time/attendance information for future marketing analysis.

In another example of the present invention, widget 100 on device 10 may used as an event pass for a tradeshow. Here access to the tradeshow is obtained through enhanced services platform 202 which retrieves the access codes and delivers them to widget 100 which is then used to enter past various access points at the event. At each access point, widget 100 may be provided with additional audio/visual support data related to each area the user is about to enter.

During such events, if device 10 is location aware, then widget 100 may supply this information to enhanced services platform 202 so that device 10 may be precisely controlled. For example, if enhanced services platform 202 knows where device 10 is within a building or event, like the bathroom, widget 100 may be controlled to the effect that the user does not get calls. Or if the user is in a conference room at the event, widget 100 may be controlled so that they get a tactile (vibrate) alert and the message, either voice or data, instead of a live call.

In each instance it is contemplated that enhanced services platform 202 and the event coordinator have a pre-existing mutual agreement regarding access to the events and the exchange of any desired advertisements and supplemental data for the users. Although the above descriptions have the user using their own device 10, it is also within the contemplation of the present invention that the event organizer may pre-purchase mobile devices 10, possibly in the form of event ticket devices 10A, and provide them to users upon payment.

It is understood that each of the above described functions of widget 100 are not limited to single uses but may be advantageously utilized in conjunction with one another with overlapping coverage. For example, a user at a concert may not only employ device 10 as an event ticket, but may also employ other features of widget 10, such as item purchase (e.g. Concert merchandise) and contact list features (to see the location of and talk to other members who are at the same event). It is understood that any combination of the features of widget 100 and enhanced services platform 202, used alone or in combination with one another, are within the contemplation of the present invention.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A method for providing enhanced commercial activities to a mobile device user, said method comprising the steps of:
   providing a user with an application for use in conducting commercial transactions through a mobile wireless device, said application configured to display at least a first advertisement related to at least one commercial product;
   receiving an incoming communication from said wireless device, via said application, at an enhanced services platform of a directory assistance center, wherein information about said at least first advertisement and said at least one commercial product is processed by said enhanced services platform;
   retrieving stored account information associated with said user;
   retrieving options related to said commercial product and providing said user with said options relating to said commercial product; and
   based on said commercial product and based on said retrieved stored account information associated with said user, selecting at least one second advertisement for display on said user's device via said application, said at least one second advertisement being related to said commercial product, wherein said at least one second-advertisement for display on said user's device is displayed on a skin advertising space of said application on a display on said mobile device.

2. The method as claimed in claim 1, wherein said application is an advertiser supported widget supported by said enhanced services platform.

3. The method as claimed in claim 1, wherein said account information includes billing/shipping information and payment method authorizations.

4. The method as claimed in claim 1, wherein said application displays said at least a first advertisement related to at least one commercial product based on information from an RFID tag in an advertisement.

5. The method as claimed in claim 1, wherein said step of providing said user with options relating to said commercial product is based on a cooperative arrangement between the directory assistance center and a commercial enterprise that makes said commercial product.

6. The method as claimed in claim 5, further comprising a step of providing said commercial enterprise with a report, including demographic data on said user that received said at least a first advertisement on said application relating to said commercial product.

7. The method as claimed in claim 1, wherein said step of providing said user with options relating to said product include options selected from the group consisting of offer to buy said product now, offer to buy said product in the future, and offer to provide information about said product.

8. The method as claimed in claim 1, wherein said at least one second-advertisement for display on said user's device is displayed on a skin advertising space of said application on a display on said mobile device.

* * * * *